United States Patent
Inoue et al.

(10) Patent No.: US 11,233,231 B2
(45) Date of Patent: Jan. 25, 2022

(54) ELECTRODE WITH HEAT-RESISTANT INSULATING LAYER

(71) Applicant: NEC CORPORATION, Tokyo (JP)

(72) Inventors: Kazuhiko Inoue, Tokyo (JP); Shin Serizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 16/337,646

(22) PCT Filed: Sep. 28, 2017

(86) PCT No.: PCT/JP2017/035206
§ 371 (c)(1),
(2) Date: Mar. 28, 2019

(87) PCT Pub. No.: WO2018/062383
PCT Pub. Date: Apr. 5, 2018

(65) Prior Publication Data
US 2020/0035996 A1   Jan. 30, 2020

(30) Foreign Application Priority Data

Sep. 29, 2016   (JP) .............................. JP2016-191000

(51) Int. Cl.
| H01M 2/10 | (2006.01) |
| H01M 4/139 | (2010.01) |
| H01M 4/60 | (2006.01) |
| H01M 4/62 | (2006.01) |
| H01M 50/20 | (2021.01) |

(52) U.S. Cl.
CPC ........... *H01M 4/139* (2013.01); *H01M 4/606* (2013.01); *H01M 4/623* (2013.01); *H01M 50/20* (2021.01)

(58) Field of Classification Search
None
See application file for complete search history.

(56) References Cited

U.S. PATENT DOCUMENTS

| 2007/0099081 A1* | 5/2007 | Matsuda | ............... H01M 4/587 |
| | | | 429/217 |
| 2014/0272595 A1* | 9/2014 | Cristadoro | ............ H01M 4/137 |
| | | | 429/231.95 |

FOREIGN PATENT DOCUMENTS

| CN | 1862850 A | 11/2006 |
| CN | 101006595 A | 7/2007 |
| CN | 102119458 A | 7/2011 |
| CN | 102598367 A | 7/2012 |
| CN | 103250259 A | 8/2013 |
| CN | 104623307 A | 8/2015 |
| JP | 9-302225 A | 11/1997 |

(Continued)

OTHER PUBLICATIONS

WO2014106954A1—machine translation (Year: 2014).*

(Continued)

*Primary Examiner* — Haroon S. Sheikh
(74) *Attorney, Agent, or Firm* — Sughrue Mion, PLLC

(57) ABSTRACT

The purpose of the present invention is to provide an electrode with reduced thermal deterioration even though the electrode has an insulating layer comprising a polyimide. The present invention relates to an electrode comprising a current collector and an electrode mixture layer, wherein the electrode comprises an insulating layer comprising a polyimide and an aromatic compound having an electron donating group and an organic acid group.

9 Claims, 1 Drawing Sheet

(56) References Cited

FOREIGN PATENT DOCUMENTS

| | | | |
|---|---|---|---|
| JP | 2000030686 A | * | 1/2000 |
| JP | 2000-228200 A | | 8/2000 |
| JP | 2004-115813 A | | 4/2004 |
| JP | 2005-243303 A | | 9/2005 |
| JP | 2005-298623 A | | 10/2005 |
| JP | 2009-4289 A | | 1/2009 |
| JP | 2009-176703 A | | 8/2009 |
| JP | 2010-282849 A | | 12/2010 |
| JP | 2011-233349 A | | 11/2011 |
| JP | 2013-101919 A | | 5/2013 |
| JP | 2015-204133 A1 | | 11/2015 |
| KR | 101657084 B1 | | 9/2016 |
| WO | 2009/142203 A1 | | 11/2009 |
| WO | 2011/058981 A1 | | 5/2011 |
| WO | 2014/106954 A1 | | 7/2014 |
| WO | 2015/186814 A1 | | 12/2015 |
| WO | 2016/051784 A1 | | 4/2016 |

OTHER PUBLICATIONS

JP2000030686—machine translation (Year: 2000).*
WO2016051784A1—machine translation (Year: 2016).*
Masayuki Oba, "Effect of Curing Accelerators on Thermal Imidization of Polyamic Acids at Low Temperature", Journal of Polymer Science Part A, Mar. 1996, pp. 651-658, vol. 34, Issue 4.
Takaho Kaneda, et al., "High-Strength-High-Modulus Polyimide Fibers I. One-Step Synthesis of Spinnable Polyimides", Journal of Applied Polymer Science, 1986, pp. 3133-3149, vol. 32.
International Search Report for PCT/JP2017/035206 dated Dec. 19, 2017 [PCT/ISA/210].
Chinese Office Action for CN Application No. 201780059669.X dated Jun. 29, 2021 with English Translation.
Masayuki Oba. "Effect of Curing Accelerators on Thermal Imidization of Polyamio Acids at Low Temperature, Temperature", Journal of Polymer Science, vol. 34, No. 3, pp. 651-658, Mar. 31, 1996.

* cited by examiner

ELECTRODE WITH HEAT-RESISTANT INSULATING LAYER

CROSS REFERENCE TO RELATED APPLICATIONS

This application is a National Stage of International Application No. PCT/JP2017/035206, filed on Sep. 28, 2017, which claims priority from Japanese Patent Application No. 2016-191000, filed on Sep. 29, 2016, the contents of all of which are incorporated herein by reference in their entirety.

TECHNICAL FIELD

The present invention relates to an electrode, a battery, methods for manufacturing these and a vehicle equipped with the battery.

BACKGROUND ART

When a metallic foreign matter is mixed in a battery having high energy density for some reason, a large amount of heat is generated in the event of short-circuit. There is known an insulating coating technique that an electrode surface is coated mainly with inorganic particles for the purpose of securing the security of a battery in case of such a heat generation.

Patent document 1 discloses a porous insulating layer comprising insulating inorganic particles and a resin that bonds the particles to a positive electrode mixture layer or a negative electrode mixture layer. Short-circuit between a positive electrode mixture layer and a negative electrode mixture layer can be avoided with such a porous insulating layer, even if at least part of a separator positioned between the positive electrode mixture layer and the negative electrode mixture layer is disappeared because of melting and heat shrinkage. The insulating layer is produced by applying a coat agent to a positive electrode mixture layer or a negative electrode mixture layer.

CITATION LIST

Patent Document

Patent Document 1: Japanese patent laid-open No. 2010-282849

SUMMARY OF INVENTION

Technical Problem

When the heat generation is large, an insulating layer with a higher heat resistant resin is required. Polyimide is a high heat resistant resin. Since a polyimide is poor in terms of plasticity due to its high heat resistance, a polyimide resin product excellent in heat resistance and strength is generally obtained by shaping a polyamic acid varnish that is a precursor into a film or a coating film, and then subjecting it to a high temperature more than 300° C. to convert the polyamic acid to a polyimide (imidization).

However, when the above mentioned method of producing a polyimide product is applied to a binder of the insulating layer described in Patent document 1, there is a problem in that it is necessary to heat-treat the electrode together with the insulating layer at a temperature of 300° C. or higher. There is concern that the heat-treatment of the electrode at high temperature causes oxidation of a current collector, and melting and thermal deterioration of a binder used in the electrode mixture layer. Oxidation of a current collector results in a decrease in bonding strength between an electrode mixture layer and the current collector. Melting and thermal deterioration of a binder result in blockage of pores in an electrode mixture layer as well as a decrease in adhesiveness to active material particles. These cause deterioration of battery properties, especially a decrease in life span.

In view of the above problems, the purpose of the present invention is to provide an electrode with reduced thermal deterioration even though the electrode has an insulating layer comprising a polyimide.

Solution to Problem

The present invention relates to an electrode comprising a current collector and an electrode mixture layer, wherein the electrode comprises an insulating layer comprising a polyimide and an aromatic compound having an electron donating group and an organic acid group.

Advantageous Effect of Invention

According to the present invention, there is provided an electrode with reduced thermal deterioration even though the electrode has an insulating layer comprising a polyimide.

DESCRIPTION OF EMBODIMENTS

1. Electrode

Figure 1:
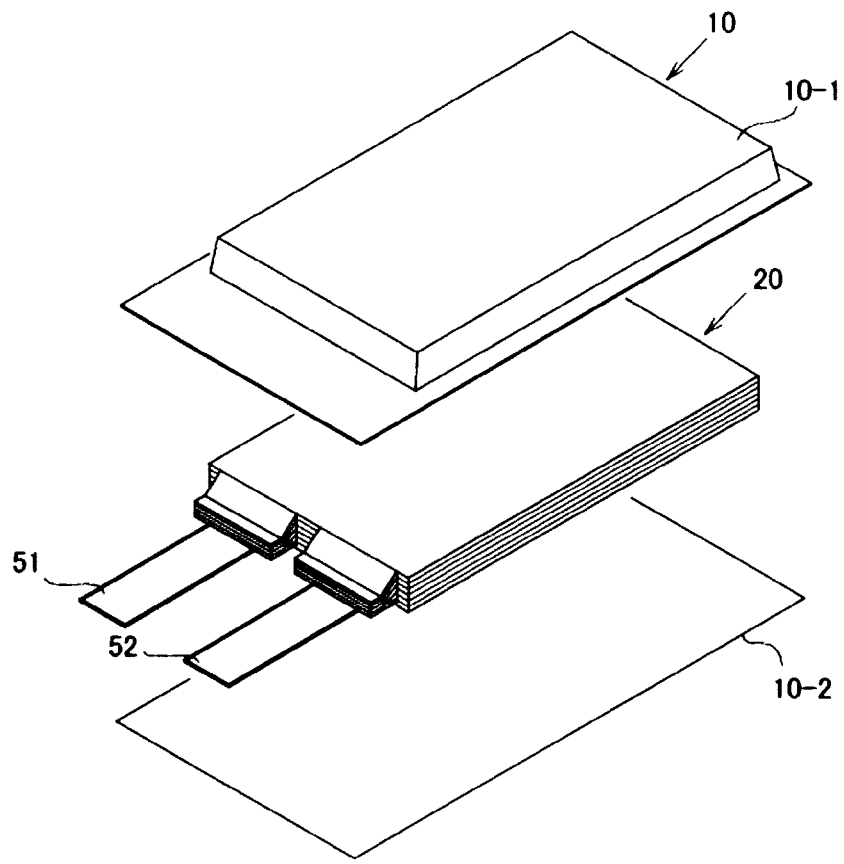
FIG. 1 is an exploded perspective view showing a basic structure of a film package battery.

The electrode has an insulating layer. The other constitutions may be the same as publicly-known ones. The electrode comprises an electrode mixture layer comprising a binder and an active material and a current collector in addition to the insulating layer. The electrode according to the present embodiment may be used either as a positive electrode or as a negative electrode.

<Insulating Layer>

The insulating layer refers to that which is applied or bonded to an electrode and is integrated with the electrode. For example, the insulating layer is provided on an electrode mixture layer or a portion of a current collector not coated with an electrode mixture layer. The insulating layer, which has been provided on such a place, can prevent contact between an electrode mixture layer or a current collector of a positive electrode and an electrode mixture layer or a current collector of a negative electrode.

The insulating layer comprises a polyimide. Unless otherwise specified herein, the term, "polyimide" may include not only polyimide but also polyamidimide.

The polyimide (in this case, polyamidimides are excluded) is a polymer comprising a repeating unit represented by the following formula (1) in at least part thereof.

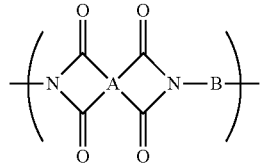
(1)

In formula (1), A represents a tetravalent group of a tetracarboxylic acid dianhydride, from which acid anhydride groups have been removed, and B represents a divalent group of a diamine, from which amino groups have been removed.

The tetracarboxylic acid dianhydrides and the diamines are generally used as polyimide raw materials. The tetracarboxylic acid dianhydride and the diamine condense to form an imide group of formula (1).

The structure of the polyimide used in the insulating layer is not particularly limited, and commercially available polyimide may be used. Examples of the tetracarboxylic acid dianhydride, which forms A of formula (1), include aromatic tetracarboxylic acid dianhydrides, such as 3,3',4,4'-biphenyltetracarboxylic dianhydride, pyromellitic dianhydride, 3,4'-oxydiphthalic anhydride, 4,4'-oxydiphthalic anhydride and 3,3',4,4'-benzophenonetetracarboxylic dianhydride, and aliphatic tetracarboxylic acid dianhydrides, such as 1,2,3,4-cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride and 1,2,3,4-butanetetracarboxylic dianhydride. Examples of the diamine, which forms B of formula (1), include aromatic diamines, such as p-phenylenediamine, m-phenylenediamine, p-xylylenediamine and m-xylylenediamine, and aliphatic diamines, such as cyclohexanediamine, di(aminomethyl)cyclohexane, diaminomethylbicycloheptane, and diaminomethyloxybicycloheptane.

The polyamidimide is a polymer comprising a repeating unit represented by the following formula (1)' in at least part thereof.

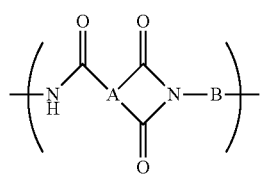
(1)'

In formula (1)', A represents a trivalent group of a tricarboxylic acid anhydride, from which an acid anhydride group and a carboxyl group have been removed, and B represents a divalent group of a diamine, from which amino groups have been removed.

The structure of the polyamidimide used in the insulating layer is not particularly limited, and commercially available polyamidimide may be used. Examples of the tricarboxylic acid anhydride, which forms A of formula (1)', include trimellitic anhydride, cyclohexane-1,2,4-tricarboxylic acid-1,2-anhydride, 3,4,4'-biphenyltricarboxylic acid anhydride and 3,4,4'-diphenylmethane tricarboxylic acid anhydride. Examples of the diamine, which forms B of formula (1), include the same diamines as those exemplified in formula (1).

The polyimide may comprise repeating units of formulae (1) and (1)' together.

The polyimide may comprise an amic acid repeating unit represented by formula (2) or (2)', which is a precursor.

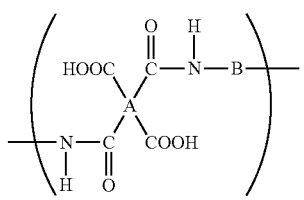
(2)

In formula (2), A and B are the same as A and B of formula (1) respectively.

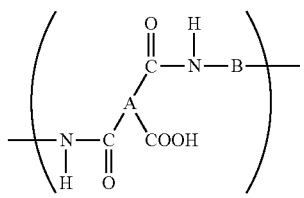
(2)'

In formula (2)', A and B are the same as A and B of formula (1)' respectively.

In the polyimide, the ratio of the total number of the repeating units represented by formula (1) or (1)' to the total number of the repeating units represented by formula (1) or (1)' and the repeating units represented by formula (2) or (2)' (hereinafter, the ratio will be referred to as imidization rate) is not particularly limited and may be appropriately set by a person ordinary skilled in the art. The imidization rate may be controlled by temperature in the heat-treatment where a polyamic acid is converted to a polyimide. The imidization rate may be, for example, 50% or more or 80% or more, and may be 100%. The imidization rate of the polyamic acid can be measured by NMR or FTIR.

The content of the repeating units represented by the above mentioned formula (1) or (1)' in the polyimide is not particularly limited and is appropriately set. For example, it may be 50 mol % or more or 80 mol % or more and may be 100 mol % of all repeating units.

The content of the polyimide in the insulating layer is not particularly limited and may be appropriately set by a person ordinary skilled in the art. The content of the polyimide in the insulating layer depends on the content of other additives, especially the insulating filler described later. When the insulating layer does not comprise the insulating filler, the polyimide may be a main material of the insulating layer. The lower limit of the content of the polyimide may be 50 mass % or more or 80 mass % or more of the insulating layer, and the upper limit may be 99.9 mass % or less or 95 mass % or less of the insulating layer. When the insulating layer comprises the insulating filler, the insulating filler may be a main material of the insulating layer, and the polyimide is added mainly to bond the insulating filler. The lower limit of the content of the polyimide may be 0.5 mass % or more or 1 mass % or more of the insulating layer, and the upper limit may be 90 mass % or less, 70 mass % or less or 50 mass % or less of the insulating layer.

The insulating layer comprises a catalyst promoting the imidization at low temperature. The catalyst is preferably an aromatic compound having an electron donating group and an organic acid group (hereinafter, this may be simply referred to as "aromatic compound"). It has been also reported that aromatic compounds having only an organic acid group promote the imidization. However, when the aromatic compound having an electron donating group and an organic acid group is used, a high imidization rate can be achieved even by heat-treatment at low temperature. The current collector and the electrode mixture layer are heated together with the insulating layer in the heat-treatment, but by lowering the heat-treatment temperature, oxidation of the current collector and melting and thermal deterioration of the binder used in the electrode mixture layer can be prevented.

The electron donating group only needs to be a group having a negative Hammett substituent constant when it is substituted at the para position of benzoic acid. Examples of the electron donating group include alkyl group, alkoxy group, amino group, hydroxyl group, mercapto group, alkylthio group, and the like. Among them, alkyl group and hydroxyl group are particularly preferred, and hydroxyl group is most preferred. The number of the electron donating groups present in the aromatic compound may be one or more. Preferably, the number of the electron donating group is one. The number of carbon atoms of alkyl group, alkoxy group or alkylthio group is not particularly limited but may be, for example, 1 to 4.

Examples of the organic acid group include carboxyl group, sulfo group, and phosphate group. Among them, carboxyl group is particularly preferred. The number of the organic acid groups present in the aromatic compound may be one or more, preferably one or two, and most preferably one. When the organic acid groups are present in the aromatic compound in excess, they react with the polyamic acid three dimensionally, and the polyamic acid gels in some cases. To prevent this, it is preferable to set the number of the organic acid groups in the aromatic compound to two or less. When two or more of the organic acid groups are present in the aromatic compound, the organic acid groups are preferably substituted at positions away from each other, for example, in meta relation, para relation or the like in the case of benzene ring. It becomes possible to prevent the organic acid groups of the aromatic compound from undergoing condensation with each other in the molecule by arranging the organic acid groups at positions away from each other.

Preferred aromatic compounds are those in which hydrogens of the aromatic ring(s) have been directly substituted with the electron donating group and the organic acid group. Examples of the aromatic ring skeleton include benzene, biphenyl, naphthalene and the like. Among them, benzene has a low molecular weight and is preferred for increasing the energy density of the battery.

Examples of the preferred aromatic compound include hydroxybenzoic acid, aminobenzoic acid, alkylbenzoic acid, mercaptobenzoic acid, alkoxybenzoic acid, alkylthiobenzoic acid, hydroxybiphenyl carboxylic acid, aminobiphenyl carboxylic acid, alkylbiphenyl carboxylic acid, mercaptobiphenyl carboxylic acid, alkoxybiphenyl carboxylic acid, alkylthiobiphenyl carboxylic acid, hydroxylnaphthalenecarboxylic acid, aminonaphthalenecarboxylic acid, alkylnaphthalenecarboxylic acid, mercaptonaphthalenecarboxylic acid, alkoxynaphthalenecarboxylic acid, alkylthionaphthalenecarboxylic acid, and the like. The substitution positions of the electron donating group and the organic acid group in these compounds are not limited, but the compounds in which the electron donating group and the organic acid group are substituted at positions away from each other are more preferred. When the skeleton of the aromatic compound is benzene, the compounds in which the electron donating group and the organic acid group are in meta relation or para relation, especially in para relation are preferred. When the skeleton of the aromatic compound is biphenyl, the compounds in which the electron donating group and the organic acid group are at 4,4' position, 3,4' position, or 3,3' position, especially at 4,4' position are preferred. When the skeleton of the aromatic compound is naphthalene, the compounds in which the electron donating group and the organic acid group are at 2,6 position, 2,7 position, or 2,4 position, especially at 2,6 position are preferred.

The aromatic compound is used for converting a polyamic acid that is a precursor to a polyimide at lower temperature. After the reaction, at least a part of the aromatic compound remains in the insulating layer, maintaining its structure. The upper limit of the amount of the aromatic compound in the insulating layer is preferably 60 mass % or less, and more preferably 40 mass % or less, and the lower limit is preferably 0.01 mass % or more, and more preferably 3 mass % or more with respect to the polyimide contained in the insulating layer.

The insulating layer may further comprise insulating filler as an optional component. Examples of the insulating filler include metal oxides and metal nitrides, specifically inorganic particles, such as aluminum oxide (alumina), silicon oxide (silica), titanium oxide (titania), zirconium oxide (zirconia), magnesium oxide (magnesia), zinc oxide, strontium titanate, barium titanate, aluminum nitride and silicon nitride, and organic particles, such as silicone rubber.

The content of the insulating filler in the insulating layer is not particularly limited and may be appropriately set by a person ordinary skilled in the art. When the insulating filler is added, the lower limit of the content of the insulating filler is preferably 10 mass % or more, more preferably 30 mass % or more and still more preferably 50 mass % or more of the insulating layer, and the upper limit is preferably 99.5 mass % or less and more preferably 99 mass % or less of the insulating layer.

The particle diameter of the insulating filler is not particularly limited and may be appropriately set by a person ordinary skilled in the art. The lower limit of the 50% particle diameter (D50) of the insulating filler is preferably 0.1 μm or more and more preferably 0.3 μm or more, and the upper limit is preferably 10.0 μm or less and more preferably 1.0 μm or less. The 50% particle size (D50) can be measured by a laser diffraction particle size distribution measuring apparatus (volume-based).

When the insulation layer is provided on the electrode mixture layer, the insulation layer preferably has pores through which ions pass. The porosity of the insulating layer is not particularly limited and may be appropriately set by a person ordinary skilled in the art. The lower limit of the porosity is preferably 30% or more and more preferably 40% or more, and the upper limit is preferably 90% or less and more preferably 80% or less. The porosity of the insulating layer is measured by mercury penetration method.

The electrode having the insulating layer may be produced by a publicly-known method. In one embodiment, the method for producing the electrode having the insulating layer comprises steps of applying a polyamic acid solution comprising the polyamic acid, the aromatic compound comprising an electron donating group and an organic acid group and a solvent onto an electrode and heat-treating the electrode.

The solvent used in the polyamic acid solution may be appropriately selected by a person ordinary skilled in the art. Examples of the solvent include N-methyl-2-pyrrolidone (abbreviation: NMP), N,N-dimethylformamide, N,N-dimethylacetamide, dimethylsulfoxide, hexamethylphosphoramide, 1,3-dimethyl-2-imidazolidinone and the like.

A high imidization rate can be achieved even at low temperature due to the aromatic compound contained in the polyamic acid solution. The amount of the aromatic compound in the polyamic acid solution is preferably 60 mass % or less and more preferably 40 mass % or less with respect to the polyamic acid. The amount of the aromatic compound in the polyamic acid solution is preferably 0.01 mass % or more and more preferably 3 mass % or more with respect to the polyamic acid.

The polyamic acid solution may comprise other components, such as phase-separation agents and insulating filler. In this case, the mixture may be slurry. If necessary, a step of forming pores in the polyamic acid layer or the polyimide layer may be further added to the above-mentioned method for producing the insulating layer. The method for forming pores includes publicly known methods, such as a phase separation method and an extraction method. There is also known a simple method in which pores can be formed simultaneously with the heat-treatment without an additional step.

For example, when a poor solvent of the polyamic acid, such as an ether solvent, having a boiling point higher than that of the solvent has been added to the polyamic acid solution as a phase-separation agent, the concentration of the poor solvent increases in the heat-treatment because the solvent volatilizes, and the poor solvent and the polyamic acid are phase-separated to form pores in the polyamic acid layer.

For example, when the polyamic acid solution comprising the insulating filler was used, a porous layer made of the insulating filler bonded with the polyimide is formed by heat-treating the polyamic acid layer. In this method, it is preferable to use a small amount of the polyamic acid relative to the insulating filler so that the polyimide, which functions as a binder in the insulating filler layer, will not fill up pores.

The heat-treatment temperature is not particularly limited and may be appropriately set by a person ordinary skilled in the art. In order to prevent the deterioration of the current collector and the electrode mixture layer, which are heat-treated together with the insulating layer, the heat-treatment temperature is preferably less than 200° C., more preferably 180° C. or less, further more preferably 150° C. or less and most preferably 130° C. or less. Also, in order to increase imidization rate, the heat-treatment temperature is preferably 50° C. or more, more preferably 80° C. or more and most preferably 90° C. or more. The heat-treatment may be conducted under any atmosphere of air, an inert gas such as nitrogen, and vacuum. The time for the heat-treatment depends on temperature and amount, but it may be preferably 1 minute or more and 24 hours or less, and more preferably 5 minutes or more and 5 hours or less. Volatile components such as the solvent of the polyamic acid solution may be removed by the heat-treatment.

<Active Material>

The positive electrode active material is not particularly limited and may be selected form several viewpoints. In terms of achieving high energy density, it is preferable to contain a compound having high capacity. Examples of the high capacity compound include lithium nickelate ($LiNiO_2$) and lithium nickel composite oxides in which a part of the Ni of lithium nickelate is replaced by another metal element, and layered lithium nickel composite oxides represented by the following formula (3) are preferred.

$$Li_yNi_{(1-x)}M_xO_2 \quad (3)$$

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (3). Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \geq 0.2$) and $Li_\alpha Ni_\beta Co_\gamma Al_\delta O_2$ ($0 < \alpha \leq 1.2$, preferably $1 \leq \alpha \leq 1.2$, $\beta+\gamma+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2 LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (3). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (3) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (3)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2 Li_xMn_2O_4$ ($0 < x < 2$), $Li_2MnO_3$, and $Li_xMn_{1.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The negative electrode active material is not particularly limited, and examples thereof specifically include metals, metal oxides and carbon.

Examples of the metal include Li, Al, Si, Pb, Sn, In, Bi, Ag, Ba, Ca, Hg, Pd, Pt, Te, Zn, La, alloys of two or more of these and the like. Alternatively, it may be used by mixing two or more of these metals and alloys. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. As silicon oxide, those represented by the composition formula $SiO_x$ ($0<x\leq2$) are preferred. Also, for example, 0.1 to 5 mass % of one or two or more elements selected from nitrogen, boron, and sulfur can be added to the metal oxide. In this way, the electroconductivity of the metal oxide can be enhanced.

Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

A conductive assisting agent may be added together with the active materials for the purpose of lowering the impedance. Examples of the conductive assisting agent include flake-like, soot, and fibrous carbon fine particles and the like, for example, graphite, carbon black, acetylene black, vapor grown carbon fibers (for example, VGCF manufactured by Showa Denko) and the like.

<Binder>

The binder used in the electrode mixture layer is not particularly limited. Examples of the binder include fluorinated resins, such as polyvinylidene fluoride, vinylidene fluoride-hexafluoropropylene copolymer, vinylidene fluoride-tetrafluoroethylene copolymer, polytetrafluoroethylene; polyolefin resins, such as polypropylene and polyethylene; acryl resins, such as polyacrylic acid, polyacrylic acid salts, polymethacrylic acid, polymethacrylic acid salts, polyacrylic acid esters, polymethacrylic acid esters, copolymers composed of monomer units constituting these resins and cross-linked bodies thereof; polystyrene; polyacrylonitrile; polybutadiene; copolymers composed of monomer units constituting these resins; and diene type rubbers, such as styrene butadiene rubber (SBR), which is a cross-linked body thereof. A mixture of a plurality of the resins, a copolymer composed of monomer units constituting these resins or a cross-linked body thereof can be also used. When an aqueous binder such as an SBR emulsion is used, a thickener such as carboxymethyl cellulose (CMC) can also be used. A polyimide or a polyamidimide can be also used. Aromatic polyimides are preferable. Among these, when a resin that requires heat-treatment (imidization reaction) at high temperature is used, the aromatic compound having an electron donating group and an organic acid group, which has been exemplified as an imidization catalyst for the insulating layer, is preferably used together with the polyimide.

In one embodiment, from the viewpoint of battery lifespan, highly rubbery materials capable of strongly bonding active materials in a small amount is preferred as the resin used as the binder of the electrode mixture layer. In general, such resins are often low in heat resistance. That is, the melting point or the heat resisting temperature of the binder is preferably 200° C. or less and more preferably 170° C. or less. On the other hand, when the heat resistance of the binder is too low, there is a possibility that the battery function is deteriorated. The melting point or the heat resisting temperature of the binder is preferably 80° C. or more and more preferably 100° C. or more. Specific examples of such a binder include polyvinylidene fluoride, polypropylene, polyethylene, styrene butadiene rubber, polyacrylic acid, polyacrylic acid salts, polymethacrylic acid, polymethacrylic acid salts, polyacrylic acid esters, polymethacrylic acid esters. The melting point of the resin can be determined, for example, from a melting temperature measured by a differential scanning calorimeter (DSC) in accordance with JIS K 7121.

A plurality of the binders may be mixed and used. The amount of the binder is preferably 2 to 20 parts by mass based on 100 parts by mass of the active material, from the viewpoint of "sufficient binding strength" and "high energy density" being in a trade-off relation with each other.

<Current Collector>

The current collector is not particularly limited. As a negative electrode current collector, from the view point of electrochemical stability, aluminum, nickel, stainless, chromium, copper, silver or an alloy thereof may be used. As a positive electrode current collector, aluminum, nickel, silver or an alloy thereof may be used. Examples of the shape of the current collector include foil, plate and mesh shapes.

2. Battery

A highly safe battery can be manufactured using the electrode having the insulating layer in at least one of the positive electrode and the negative electrode. The battery can be manufactured in accordance with a usual method. An example of a method for manufacturing a battery will be described taking a stacked laminate type battery as an example. First, in the dry air or an inert atmosphere, the positive electrode and the negative electrode are placed to oppose to each other via the separator to form an electrode element. Next, this electrode element is accommodated in an outer package (container), an electrolyte solution is injected, and the electrodes are impregnated with the electrolyte solution. Thereafter, the opening of the outer package is sealed to complete a battery. In the following, embodiments of constituents other than electrodes will be described.

<Separator>

The battery may not have a separator because the electrode having the insulating layer is used in at least one of the positive electrode and the negative electrode. In this case, the raw material cost and the manufacturing cost of the battery can be reduced. The insulating layer may be used in combination with a separator. In this case, insulation between the positive electrode and the negative electrode can be maintained with the insulating layer, even when the separator melts and contracts in the event of heat generation.

The separator may be of any type as long as it prevents electron conduction between the positive electrode and the negative electrode, does not inhibit the permeation of charged substances, and has durability against the electrolyte solution. Specific examples of the material include polyolefins such as polypropylene and polyethylene, cellulose, polyesters such as polyethylene terephthalate and polybutylene terephthalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Electrolyte Solution>

The electrolyte solution is not particularly limited, but is preferably a non-aqueous electrolyte solution containing a non-aqueous solvent and a supporting salt which are stable at the operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC) or the like is preferably contained.

The non-aqueous solvent may be used alone, or in combination of two or more.

Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$. The supporting salts may be used alone or in combination of two or more. From the viewpoint of cost reduction, $LiPF_6$ is preferable.

<Structure of Battery>

Figure 2:
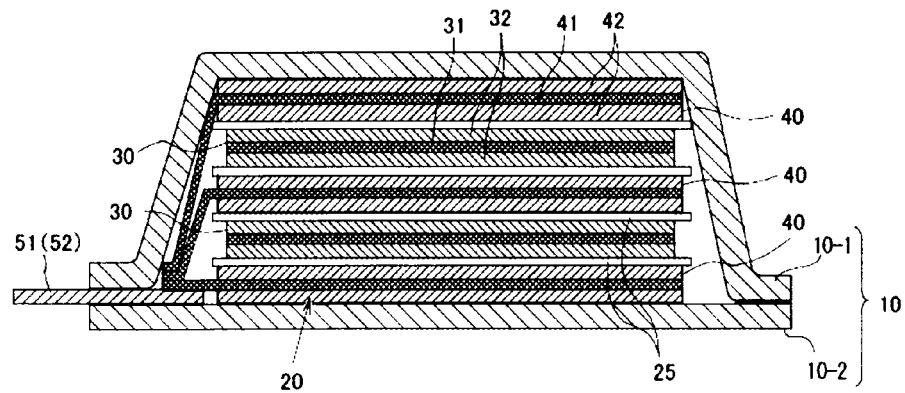
FIG. 2 is a cross-sectional view schematically showing a cross section of the battery of FIG. 1.

The battery according to the present embodiment may be, for example, a battery having a structure as shown in FIGS. 1 and 2. This battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

3. Assembled Battery

A plurality of the batteries according to the present embodiment may be combined to form an assembled battery. The assembled battery may be configured by connecting two or more batteries according to the present embodiment in series or in parallel or in combination of both. The connection in series and/or parallel makes it possible to adjust the capacitance and voltage freely. The number of the batteries included in the assembled battery can be set appropriately according to the battery capacity and output.

4. Vehicle

The battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and it may be a variety of power source of other vehicles, such as a moving body like a train.

EXAMPLE

A positive electrode C-1 was prepared as follows. A layered lithium nickel composite oxide, $LiNi_{0.80}Co_{0.15}Al_{0.05}O_2$ (hereinafter, also referred to as NCA) as a positive electrode active material, carbon black as a conductive assisting agent and polyvinylidene fluoride (hereinafter, also referred to as PVdF) as a binder were weighed at a mass ratio of 90:5:5 and kneaded with N-methyl pyrrolidone to form a positive electrode slurry. The prepared positive electrode slurry was applied to a 20 μm thick aluminum foil current collector with a doctor blade, heat-dried at 110° C. for 5 minutes and further pressed, and then a positive electrode C-1 was prepared.

Four kinds of negative electrodes A-1 to A-4 were prepared as follows.

<Negative Electrode A-1>

Artificial graphite (hereinafter, also referred to as C) and a carboxymethyl cellulose (CMC) aqueous solution were kneaded with a rotating and revolving mixer (Awatori Rentaro ARE-500 manufactured by Thinky Corporation), and then styrene butadiene copolymer (SBR) was added to prepare a negative electrode slurry. The mass ratio of the artificial graphite, CMC and SBR was set to 97:1:2. This slurry was applied to a 10 μm thick copper foil with a doctor blade, heat-dried at 110° C. for 5 minutes and further pressed, and then a negative electrode A-1 was prepared.

<Negative Electrode A-2>

Artificial graphite, polyvinylidene fluoride (PVdF) and N-methyl pyrrolidone were kneaded with a rotating and revolving mixer (Awatori Rentaro ARE-500 manufactured by Thinky Corporation) to prepare a negative electrode slurry. The mass ratio of the artificial graphite and PVdF was set to 95:5. This slurry was applied to a 10 μm thick copper foil with a doctor blade, heat-dried at 110° C. for 5 minutes and further pressed, and then a negative electrode A-2 was prepared.

<Negative Electrode A-3>

A carbon coated $SiO_x$ composite having a 50% particle diameter of 8 μm (hereinafter, also referred to as SiO) (the amount of the carbon in the composite was 7 mass %), a polyamic acid solution (trade name: "U-varnish A", manufactured by Ube industries, Ltd., polyamic acid concentration: 20 mass %) and p-hydroxybenzoic acid were weighed at a mass ratio of 50:49:0.5. These were kneaded with N-methyl pyrrolidone to prepare a slurry. The slurry was applied to a 10 μm thick copper foil with a doctor blade. Then it was heated at 120° C. for 5 minutes to remove N-methyl pyrrolidone by drying. This was pressed and heated at 150° C. for 1 hour under atmospheric pressure in air, and then a negative electrode A-3 was prepared.

<Negative Electrode A-4>

A carbon coated $SiO_x$ composite having a 50% particle diameter of 8 μm (the amount of the carbon in the composite was 7 mass %) and a polyamic acid solution (trade name: "U-varnish A", manufactured by Ube industries, Ltd., polyamic acid concentration: 20 mass %) were weighed at a mass ratio of 50:49. These were kneaded with N-methyl pyrrolidone to prepare a slurry. The slurry was applied to a 10 μm thick copper foil with a doctor blade. Then it was heated at 120° C. for 5 minutes to remove N-methyl pyrrolidone by drying. This was pressed and heated at 350° C. for 1 hour under atmospheric pressure in air, and then a negative electrode A-4 was prepared.

Nine kinds of insulating layer slurries I-1 to I-9 were prepared as follows.

<Insulating Layer Slurry I-1>

Alumina particles (50% particle diameter: 1.0 μm), a N-methyl pyrrolidone solution of a polyamic acid (trade name: "U-varnish A", manufactured by Ube industries, Ltd., polyamic acid concentration: 20 mass %) as a binder and p-hydroxybenzoic acid were weighed at a mass ratio of 90:10:0.1. These were kneaded with N-methyl pyrrolidone to prepare an insulating layer slurry I-1.

<Insulating Layer Slurry I-2>

Alumina particles (50% particle diameter: 1.0 μm), a N-methyl pyrrolidone solution of a polyamic acid (trade name: "U-varnish A", manufactured by Ube industries, Ltd., polyamic acid concentration: 20 mass %) as a binder and p-methylbenzoic acid were weighed at a mass ratio of 90:10:0.1. These were kneaded with N-methyl pyrrolidone to prepare an insulating layer slurry I-2.

<Insulating Layer Slurry I-3>

Alumina particles (50% particle diameter: 1.0 μm), a N-methyl pyrrolidone solution of a polyamic acid (trade name: "U-varnish A", manufactured by Ube industries, Ltd., polyamic acid concentration: 20 mass %) as a binder and m-hydroxybenzoic acid were weighed at a mass ratio of 90:10:0.1. These were kneaded with N-methyl pyrrolidone to prepare an insulating layer slurry I-3.

<Insulating Layer Slurry I-4>

Alumina particles (50% particle diameter: 1.0 μm), a N-methyl pyrrolidone solution of a polyamic acid (trade name: "U-varnish A", manufactured by Ube industries, Ltd., polyamic acid concentration: 20 mass %) as a binder and o-hydroxybenzoic acid were weighed at a mass ratio of 90:10:0.1. These were kneaded with N-methyl pyrrolidone to prepare an insulating layer slurry I-4.

<Insulating Layer Slurry I-5>

Alumina particles (50% particle diameter: 1.0 μm) and a N-methyl pyrrolidone solution of a polyamic acid (trade name: "U-varnish A", manufactured by Ube industries, Ltd., polyamic acid concentration: 20 mass %) as a binder were weighed at a mass ratio of 90:10. These were kneaded with N-methyl pyrrolidone to prepare an insulating layer slurry I-5.

<Insulating Layer Slurry I-6>

A N-methyl pyrrolidone solution of a polyamic acid (trade name: "U-varnish A", manufactured by Ube industries, Ltd.) was concentrated to adjust the solid concentration to 50 mass %. This concentrated solution, triethylene glycol dimethyl ether and p-hydroxybenzoic acid were weighed at a mass ratio of 10:20:0.25. These were mixed to prepare an insulating layer slurry I-6. This mixture was a solution, but is referred to as insulating layer slurry I-6 for convenience.

<Insulating Layer Slurry I-7>

A N-methyl pyrrolidone solution of a polyamic acid (trade name: "U-varnish A", manufactured by Ube industries, Ltd.) was concentrated to adjust the solid concentration to 50 mass %. This concentrated solution and triethylene glycol dimethyl ether were weighed at a mass ratio of 10:20. These were mixed to prepare an insulating layer slurry I-7. This mixture was a solution, but is referred to as insulating layer slurry I-7 for convenience.

<Insulating Layer Slurry I-8>

Trimellitic acid chloride and diaminodiphenylmethane were mixed in a N-methyl pyrrolidone solution to prepare a N-methyl pyrrolidone solution of a polyamic acid (polymer concentration: 20 mass %) that is a polyamidimide precursor. The number average molecular weight of the polyamic acid was 41000. Alumina particles (50% particle diameter: 1.0 μm), the N-methyl pyrrolidone solution of the polyamic acid prepared as a binder and p-hydroxybenzoic acid were weighed at a mass ratio of 90:10:0.1. These were kneaded with N-methyl pyrrolidone to prepare an insulating layer slurry I-8.

<Insulating Layer Slurry I-9>

An insulating layer slurry I-9 was prepared in the same manner as the insulating layer slurry I-8 except that p-hydroxybenzoic acid was not added.

The insulating layer slurries I-1 to I-9 were applied to surfaces of electrodes (the positive electrode C-1 or the negative electrodes A-1 to A-4) described in Table 1 with a doctor blade, and heated at 120° C. for 5 minutes to remove N-methyl pyrrolidone by drying. These were pressed and heated at a temperature (150° C. to 350° C.) described in Table 1 under atmospheric pressure in air for 1 hour, and then electrodes with insulating layers were prepared. The cross sections were observed, and the thickness of the insulating layers was 3 to 8 μm. $^{13}$C-NMR measurement of the insulating layers was conducted. The molar ratios of the polyamic acids (the carbon at 169 ppm), which were raw materials of the binders, and the polyimides (the carbon at 166 ppm), which were obtained by the ring closure reaction, were determined by a waveform separation method. Based on these, the imidization rates were calculated. An imidization rate of less than 80% was rated as x, an imidization rate of 80% or more and less than 85% was rated as ○, and an imidization rate of 85% or more was rated as ○○. The results are shown in Table 1.

In each example, the combination of the positive electrode and the negative electrode shown in Table 1 was used. An aluminum terminal and a nickel terminal were welded respectively to these positive electrode and negative electrode. These were stacked with separators sandwiched therebetween to prepare an electrode element. The electrode element was packed in a laminate film, and an electrolyte solution was injected to the inside of the laminate film. Thereafter, the laminate film was sealed by heat bonding while reducing the pressure within the laminate film. In this manner, a plurality of planner secondary batteries before initial charging was prepared. Herein, a single layer polypropylene porous film (thickness: 20 μm) was used as the separator. As the laminate film, a polypropylene film on which aluminum was vapor deposited was used. As the electrolyte solution, a solution containing 1.0 mol/l of $LiPF_6$ as an electrolyte and a mixed solvent of ethylene carbonate and diethyl carbonate (volume ratio: 7:3) as a non-aqueous electrolyte solvent was used.

<Battery Capacity>

The fabricated secondary battery was charged to 4.2 V. The charging was performed by a CCCV method at a current of 0.2C, and after a voltage of 4.2 V was attained, the voltage was kept constant for 1 hour. Then the battery was discharged to 2.5 V by a CC method at current of 0.2C. Table 1 shows this discharge capacity as initial capacity. Subsequently, this charge/discharge operation was repeated. Herein, the 0.2C current means a current at which it takes 5 hours to completely discharge an arbitrary battery in a fully charged state if the battery is discharged at a constant current. In each example, the charging and the discharging were performed at a current of 200 mA. Table 1 shows the ratio of the discharge capacity at the $500^{th}$ cycle to the initial discharge capacity as capacity retention rate.

TABLE 1

| | Insulating layer | | | | | |
|---|---|---|---|---|---|---|
| | Slurry I- | Catalyst | Insulating particles | Application | Heat-treatment temperature (° C.) | Imidization |
| Example 1 | 1 | A | Alumina | Negative electrode | 150 | ○ |
| Example 2 | 2 | B | Alumina | Negative electrode | 150 | ○ |
| Example 3 | 3 | C | Alumina | Negative electrode | 150 | ○ |
| Example 4 | 4 | D | Alumina | Negative electrode | 150 | ○ |
| Example 5 | 1 | A | Alumina | Negative electrode | 150 | ○ |
| Example 6 | 6 | A | None | Negative electrode | 150 | ○ |
| Example 7 | 1 | A | Alumina | Positive electrode | 150 | ○ |
| Example 8 | 8 | A | Alumina | Negative electrode | 150 | ○ |
| Comparative Example 1 | 5 | None | Alumina | Negative electrode | 150 | x |
| Comparative Example 2 | 5 | None | Alumina | Negative electrode | 350 | ○○ |
| Comparative Example 3 | 5 | None | Alumina | Negative electrode | 350 | ○○ |
| Comparative Example 4 | 1 | A | Alumina | Negative electrode | 350 | ○○ |
| Comparative Example 5 | 7 | None | None | Negative electrode | 350 | ○○ |
| Comparative Example 6 | 5 | None | Alumina | Positive electrode | 150 | x |
| Comparative Example 7 | 5 | None | Alumina | Negative electrode | 180 | x |
| Comparative Example 8 | 5 | None | Alumina | Negative electrode | 200 | ○ |
| Comparative Example 9 | 5 | None | Alumina | Negative electrode | 180 | x |
| Comparative Example 10 | 5 | None | Alumina | Negative electrode | 200 | ○ |
| Comparative Example 11 | 9 | None | Alumina | Negative electrode | 150 | x |

| | Negative electrode | | | Positive electrode (C-1) | | Initial capacity (mAh) | Capacity retention rate (%) |
|---|---|---|---|---|---|---|---|
| | Negative electrode A- | Active material | Binder | Active material | Binder | | |
| Example 1 | 1 | C | SBR | NCA | PVdF | 910 | 81 |
| Example 2 | 1 | C | SBR | NCA | PVdF | 900 | 80 |
| Example 3 | 1 | C | SBR | NCA | PVdF | 910 | 81 |
| Example 4 | 1 | C | SBR | NCA | PVdF | 920 | 79 |
| Example 5 | 2 | C | PVdF | NCA | PVdF | 910 | 80 |
| Example 6 | 3 | SiO | PI with catalyst A | NCA | PVdF | 850 | 62 |
| Example 7 | 1 | C | SBR | NCA | PVdF | 920 | 83 |
| Example 8 | 1 | C | SBR | NCA | PVdF | 900 | 81 |
| Comparative Example 1 | 1 | C | SBR | NCA | PVdF | 780 | 69 |
| Comparative Example 2 | 1 | C | SBR | NCA | PVdF | <500 | — |

TABLE 1-continued

| | | | | | | | |
|---|---|---|---|---|---|---|---|
| Comparative Example 3 | 2 | C | PVdF | NCA | PVdF | <500 | — |
| Comparative Example 4 | 1 | C | SBR | NCA | PVdF | <500 | — |
| Comparative Example 5 | 4 | SiO | PI | NCA | PVdF | 840 | 51 |
| Comparative Example 6 | 1 | C | SBR | NCA | PVdF | 810 | 72 |
| Comparative Example 7 | 1 | C | SBR | NCA | PVdF | 820 | 65 |
| Comparative Example 8 | 1 | C | SBR | NCA | PVdF | 910 | 60 |
| Comparative Example 9 | 2 | C | PVdF | NCA | PVdF | 810 | 65 |
| Comparative Example 10 | 2 | C | PVdF | NCA | PVdF | 910 | 60 |
| Comparative Example 11 | 1 | C | SBR | NCA | PVdF | 800 | 72 |

Catalysts A to D described in Table 1 are the following compounds.

Catalyst A: p-hydroxybenzoic acid
Catalyst B: p-methylbenzoic acid
Catalyst C: m-hydroxybenzoic acid
Catalyst D: o-hydroxybenzoic acid From Examples 1 to 4 and Comparative examples 1 and Example 8 and Comparative example 11, it is found that the imidization rate is increased by adding the catalyst into the insulating layer even in a heat-treatment at 150° C. or lower. The improvement in capacity retention rate at the 500$^{th}$ cycle is seemingly because the electrode mixture layer was stable due to an increase in the strength of the insulating layer even if the electrode expanded and contracted during charge and discharge. In Example 5, the binder of the negative electrode mixture layer was changed from SBR to PVdF which has low heat resistance of 200° C. or less in the same manner, but this did not affect the initial capacity and the capacity retention rate at the 500th cycle because the insulating layer was heat-treated at a temperature of 150° C. or less. In contrast, when heat-treatment temperature was raised to 180° C. to 200° C., the initial capacity was decreased as shown in Comparative examples 7 to 10. This is seemingly because the binders of the electrode mixture layers deteriorated, and some conductive paths were lost.

Comparative examples 2 to 4 show the results obtained when the heat-treatment temperature was raised to 350° C. The imidization rate of the insulating layer was good, but since the heat-treatment temperature was higher than the heat resisting temperature of the binder of the negative electrode mixture layer by about 200° C., the binding strength was lost, and an initial capacity sufficient to normally function as a battery could not be obtained. In addition, oxidative degradation was observed in the copper foil current collectors after the heat-treatment.

In Example 6 and Comparative example 5, SiO as a negative electrode active material and polyimide as a binder were used in the negative electrodes. In Example 6, since a catalyst was used for the polyimides used in the electrode mixture layer and the insulating layer respectively, the polyimides functioned normally even in the heat-treatment at a low temperature of 150° C. In Comparative example 5, the catalyst was not used for either of the polyimides. Since the heat-treat temperature was 350° C., a strong insulating layer was formed due to high imidization rate, but the capacity retention rate after 500 cycles was decreased. The capacity retention rate was presumably reduced because of delamination between the current collector and the electrode mixture layer. It is considered that the bonding strength between the copper current collector and the electrode mixture layer was reduced, because the surface of the copper current collector was oxidized in the heat treatment at 350° C.

In Example 7 and Comparative example 6, the insulating layers were applied to the positive electrodes. In Example 7 where the catalyst was used for the polyimide, the results were the same as in Example 1. In Comparative example 6 where the catalyst was not used for the polyimide, the results were the same as in Comparative example 1.

Hereinafter, the superiority of the aromatic compounds having an electron donating group and an organic acid group over aromatic compounds having only an organic acid group will be shown by referring to Reference examples.

Reference Examples 2 to 8

(Production of Electrode)

A carbon coated $SiO_x$ composite having an average particle diameter D50% of 8 μm (the amount of the carbon in the composite was 7 mass %), a polyamic acid solution (trade name: "U-varnish A", manufactured by Ube industries, Ltd., 20% by mass of polyamic acid), and an additive were respectively weighed at a mass ratio of 50:49:X. X was set to 0.9 in Reference examples 3 to 6, and X was set to 0 in Reference examples 2 and 7. In Reference example 8, X was set to 2.7. These were mixed with N-methylpyrrolidone (NMP) to prepare a slurry. The amount of water in the slurry was 200 to 300 ppm. The slurry was applied on a copper foil having a thickness of 10 μm using a doctor blade. Thereafter, the resultant was heated at 120° C. for 5 minutes to remove NMP by drying. Then, the resultant was heated for 1 hour at 150° C. under atmospheric pressure in air or at 125° C. under nitrogen gas (flow rate 70 L/min). This copper film on which an active material layer has been formed was stamped into a circular shape having a diameter of 12 mm, and an electrode was produced.

(Production of Battery)

The produced electrode was layered with a counter electrode of Li metal via an olefinic separator to produce a model cell with EC/DEC/EMC=3/5/2 (the volume ratio) containing 1 M of $LiPF_6$ as an electrolyte solution.

(Evaluation of Battery)

A charge and discharge test and a cycle test of the produced model cell were performed at 25° C. In the charge and discharge test, charge and discharge were performed twice at a current density of 0.3 mA/cm² within a voltage range of 0.03 to 1.0 V. The quantity of electricity flowed from the start to the end of charging or discharging was defined as the charge capacity or the discharge capacity, and the second charge capacity (corresponding to the amount of lithium desorption from the silicon-based electrode) was defined as 1C. The 1C capacity per mass of the $SiO_x$ composite of the electrode (Reference example 1) treated at 350° C. for 3 hours and not comprising the additive such as p-hydroxy benzoic acid was set to 100, and based on this, the 1C capacity ratio of an electrode was determined.

In the cycle test, the model cell after the charge and discharge test was used, and a cycle of performing discharge at 0.3C to 1.0 V and constant voltage discharge for 4 hours in total and then performing constant current charge at 0.3C to 0.03 V was repeated 50 times. The proportion of the discharge capacity after 50 cycles to the initial discharge capacity corresponding to the amount of lithium desorption from the silicon-based electrode) was determined as the capacity retention rate.

Reference Example 1

The mass ratio of the carbon coated $SiO_x$ composite having an average particle diameter D50% of 8 μm (the amount of the carbon in the composite was 7 mass %) and the polyamic acid solution (trade name: "U-varnish A", manufactured by Ube industries, Ltd., 20% by mass of polyamic acid) was 50:49, and the heat treatment conditions were 350° C. under nitrogen gas (flow rate 70 L/min) for 3 hours. Except for these, an electrode was produced and evaluated in the same manner as in Reference example 2.

Table 2 shows the 1C capacity ratio and the average value of the capacity retention rates after 50 cycles (unit: %, the number of measurements: 2 or more) in each example in which the heat treatment was conducted at 150° C. under atmospheric pressure in air for 1 hour. Table 3 shows the 1C capacity ratio and the average value of the capacity retention rates after 50 cycles (unit: %, measurement number: 2 or more) in each example in which the heat treatment was conducted at 125° C. under nitrogen gas (flow rate 70 L/min) for 1 hour.

TABLE 3

Evaluation results of electrodes treated at 125° C.
(in Reference example 1, treated at 350° C.)

|   |   | Reference example 1 | Reference example 7 | Reference example 8 |
|---|---|---|---|---|
|   | Additive | None | None | p-hydroxy benzoic acid |
|   | Amount | — | — | 2.7 |
| A | 1 C capacity ratio | 100 | 100 | 95 |
| B | Capacity retention rate (%) after 50 cycles at 25° C. | 92 | 76 | 84 |
|   | A × B/100 | — | 76 | 80 |

Reference Examples 9 and 10

Confirmation was also made on the case where the additive was p-aminobenzoic acid. The additive was p-aminobenzoic acid, and X was set to 0.45 or 0.20 in 50:49:X that was the mass ratio of the carbon coated $SiO_x$ composite having an average particle diameter D50% of 8 μm (the amount of the carbon in the composite was 7 mass %), the polyamic acid solution (trade name: "U-varnish A", manufactured by Ube industries, Ltd., 20% by mass of polyamic acid) and the additive. Except for these, electrodes were produced and evaluated in the same manner as in Reference examples 3 to 6, in which the heat treatment was conducted at 150° C. under atmospheric pressure in air for 1 hour. Table 4 shows the 1C capacity ratios and the average values of the capacity retention rates after 50 cycles (unit: %, the number of measurements: 2 or more) of these examples.

TABLE 2

Evaluation results of electrodes treated at 150° C. (in Reference example 1, treated at 350° C.)

|   |   | Reference example 1 | Reference example 2 | Reference example 3 | Reference example 4 | Reference example 5 | Reference example 6 |
|---|---|---|---|---|---|---|---|
|   | Additive | None | None | p-hydroxy benzoic acid | p-methyl benzoic acid | m-hydroxy benzoic acid | o-hydroxy benzoic acid |
|   | Amount | — | — | 0.9 | 0.9 | 0.9 | 0.9 |
| A | 1 C capacity ratio | 100 | 95 | 100 | 96 | 76 | 85 |
| B | Capacity retention rate (%) after 50 cycles at 25° C. | 92 | 63 | 91 | 67 | 100 | 85 |
|   | A × B/100 | — | 60 | 91 | 64 | 76 | 72 |

TABLE 4

Effect of addition amount of p-aimnobenzoic acid in electrode treated at 150° C. (in Reference example 1, treated at 350° C.)

|   |   | Reference example 1 | Reference example 2 | Reference example 9 | Reference example 10 |
|---|---|---|---|---|---|
|   | Additive | None | None | p-amino benzoic acid | p-amino benzoic acid |
|   | Amount | — | — | 0.45 | 0.20 |
| A | 1 C capacity ratio | 100 | 95 | 98 | 98 |
| B | Capacity retention rate (%) after 50 cycles at 25° C. | 92 | 63 | 69 | 77 |
|   | A × B/100 | — | 60 | 67 | 75 |

Reference Examples 11 to 13

The effect of the addition amount was confirmed when the additive was p-hydroxybenzoic acid. With respect to 50:49:X, which is the mass ratio of the carbon coated $SiO_x$ composite having an average particle diameter D50% of 8 μm (the amount of the carbon in the composite was 7 mass %), the polyamic acid solution (trade name: "U-varnish A", manufactured by Ube industries, Ltd., 20% by mass of polyamic acid) and the additive, the case where X was reduced from 0.9 to 0.23 or 0.10 and the case where X was increased to 4.4 were examined. Except for these, electrodes were produced and evaluated in the same manner as in Reference examples 3 to 6 in which the heat treatment was conducted at 150° C. under atmospheric pressure in air for 1 hour. Table 5 shows the 1C capacity ratios and the average values of the capacity retention rates after 50 cycles (unit: %, the number of measurements: 2 or more) of these examples.

TABLE 5

Effect of addition amount of p-hydroxybenzoic acid in electrode treated at 150° C. (in Reference example 1, treated at 350° C.)

|   |   | Reference example 1 | Reference example 2 | Reference example 11 | Reference example 3 | Reference example 12 | Reference example 13 |
|---|---|---|---|---|---|---|---|
|   | Additive | None | None | p-hydroxy benzoic acid | p-hydroxy benzoic acid | p-hydroxy benzoic acid | p-hydroxy benzoic acid |
|   | Amount | — | — | 4.4 | 0.9 | 0.23 | 0.10 |
| A | 1 C capacity ratio | 100 | 95 | 71 | 100 | 96 | 81 |
| B | Capacity retention rate (%) after 50 cycles at 25° C. | 92 | 63 | 96 | 91 | 89 | 79 |
|   | A × B/100 | — | 60 | 68 | 91 | 85 | 64 |

There was a correlation between the substituent of benzoic acid that were the additives and the capacity of a silicon electrode after 50 cycles (A×B in the tables). That is, the electron donating groups are effective in improving the capacity of a silicon electrode. This effect was demonstrated not only in the treatment at 150° C. under air but also in the treatment at 125° C. under nitrogen gas as shown in Table 3. In addition, the capacity of a silicon electrode after 50 cycles may be further improved by setting the addition amount of the benzoic acid derivative within a specific range in some cases.

Reference Example 14

Except for changing the additive from p-hydroxybenzoic acid to benzoic acid, an electrode was produced and evaluated in the same manner as in Reference example 3. As a result, the 1C capacity ratio (A in the table) was 44, the capacity retention rate after 50 cycles at 25° C. (B in the table) was 135%, and A×B/100 was 59.

TABLE 6

Evaluation results of electrode treated at 150° C. (in Reference example 1, treated at 350° C.)

|   |   | Reference example 1 | Reference example 14 |
|---|---|---|---|
|   | Additive | None | Benzoic acid |
|   | Amount | — | 0.9 |
| A | 1 C capacity ratio | 100 | 44 |
| B | Capacity retention rate (%) after 50 cycles at 25° C. | 92 | 135 |
|   | A × B/100 | — | 59 |

As shown in Reference example 14, since the initial capacity (A in the table) decreases when there is no substituent on the aromatic ring of benzoic acid, it is preferred that a substituent is present thereon. The reason why the capacity retention rate exceeded 100% is because a larger amount of Li than the capacity of the trial electrode was supplied from the Li metal of the counter electrode containing a larger amount of Li than the capacity of the trial electrode during the cycles. Therefore, in the case of using a counter electrode containing a smaller amount of Li than the capacity of the electrode of the present invention, it is presumable that the capacity retention rate decreases.

The above Reference examples show that a battery having high capacity can be manufactured with a polyimide binder comprising the aromatic compound having an electron donating group and an organic acid group even if the imidization has been conducted at low temperature.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The electrode and the battery with the electrode according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:
1. An electrode, comprising:
   a current collector;
   an electrode mixture layer; and
   an insulating layer provided on the electrode mixture layer and/or on a portion of the current collector that is not coated with the electrode mixture layer,
   wherein the insulating layer comprises (a) a polyimide, (b) an aromatic compound having one and only one electron donating group and one and only one organic acid group, and (c) an insulating filler.
2. The electrode according to claim 1, wherein the organic acid group is a carboxylic acid group.
3. The electrode according to claim 1, wherein the electron donating group is selected from the group consisting of alkyl group, alkoxy group, amino group, hydroxyl group, mercapto group and alkylthio group.
4. The electrode according to claim 1, wherein the electrode mixture layer comprises at least one binder selected from the group consisting of polyvinylidene fluoride, polypropylene, polyethylene, styrene butadiene rubber, acryl resins and polyimide compositions comprising an aromatic compound having an electron donating group and an organic acid group.
5. The electrode according to claim 1, wherein a content of the insulating filler is 10 mass % or more of the insulating layer.
6. A battery comprising the electrode according to claim 1.
7. The electrode according to claim 1, wherein the insulating filler comprises at least one selected from the group consisting of aluminum oxide, silicon oxide, titanium oxide, zirconium oxide, magnesium oxide, zinc oxide, strontium titanate, barium titanate, aluminum nitride, silicon nitride, and silicone rubber.
8. A method of producing an electrode comprising an insulating layer, the method comprising the steps of:
   applying a polyamic acid solution, comprising (a) a polyamic acid, (b) an aromatic compound having one and only one electron donating group and one and only one organic acid group, (c) an insulating filler, and (d) a solvent, to an electrode, and
   heat-treating the electrode at a temperature of 180° C. or less.
9. The method according to claim 8, wherein the insulating filler comprises at least one selected from the group consisting of aluminum oxide, silicon oxide, titanium oxide, zirconium oxide, magnesium oxide, zinc oxide, strontium titanate, barium titanate, aluminum nitride, silicon nitride, and silicone rubber.

* * * * *